United States Patent
Um et al.

(10) Patent No.: US 8,633,899 B2
(45) Date of Patent: Jan. 21, 2014

(54) DISPLAY DEVICE INCLUDING SENSING ELEMENTS AND DRIVING METHOD THEREOF

(75) Inventors: Yoon Sung Um, Yongin (KR); Jae Jin Lyu, Yongin (KR); Seung Beom Park, Seoul (KR)

(73) Assignee: Samsung Display Co., Ltd., Yongin (KR)

(*) Notice: Subject to any disclaimer, the term of this patent is extended or adjusted under 35 U.S.C. 154(b) by 1565 days.

(21) Appl. No.: 11/941,621

(22) Filed: Nov. 16, 2007

(65) Prior Publication Data
US 2008/0117182 A1 May 22, 2008

(30) Foreign Application Priority Data
Nov. 17, 2006 (KR) .................. 10-2006-0114022

(51) Int. Cl.
*G06F 3/041* (2006.01)
(52) U.S. Cl.
USPC .......................................... 345/173; 345/104
(58) Field of Classification Search
USPC .......... 345/87, 88, 90, 104, 173, 174; 349/12, 349/160
See application file for complete search history.

(56) References Cited

U.S. PATENT DOCUMENTS

| 6,501,529 B1* | 12/2002 | Kurihara et al. ............... 345/173 |
| 2006/0109222 A1* | 5/2006 | Lee et al. ........................ 345/88 |

FOREIGN PATENT DOCUMENTS

| JP | 6-28088 | 2/1994 |
| JP | 2001-43003 | 2/2001 |
| JP | 2001-222378 | 8/2001 |
| JP | 2002-297315 | 10/2002 |
| JP | 2004-348686 | 12/2004 |
| JP | 2006-113925 | 4/2006 |
| KR | 10-2004-0031195 | 4/2004 |
| KR | 10-2004-0093038 | 11/2004 |
| KR | 10-2005-0012967 | 2/2005 |
| KR | 10-2006-0041576 | 5/2006 |

* cited by examiner

*Primary Examiner* — Regina Liang
(74) *Attorney, Agent, or Firm* — H.C. Park & Associates, PLC (57) ABSTRACT

A display device includes a plurality of touch sensors and a touch sensor controller. The touch sensor controller defines sensing units. Each of the sensing units includes at least two touch sensors. The touch sensor controller generates coordinates information of the sensing unit when all of the touch sensors of the sensing unit are generating an output signal or at least one of the touch sensors of the sensing unit is generating an output signal.

14 Claims, 13 Drawing Sheets

|  | PRIOR ART | EMBODIMENT 1 | EMBODIMENT 2 |
|---|---|---|---|
| NUMBER OF TOUCH SENSOR IN A TOUCH SENSOR UNIT | 1 | 2 | 3 |
| NUMBER OF PIXEL ELECTRODES | 3151872 | 3151872 | 3151872 |
| NUMBER OF TOUCH SENSORS | 262656 | 262656 | 262656 |
| PROBABILITY OF CAUSING AN ELECTRICAL FAULT | $2/262656$ $=7.61452E-06$ | $[2/262656]^2$ $=5.7981E-11$ | $[2/262656]^3$ $=1.9492E-31$ |
| NUMBER OF TOUCH SENSORS HAVING AN ELECTRICAL FAULT | 2 | $5.7981E-11 \fallingdotseq 0$ | $1.9492E-31 \fallingdotseq 0$ |

FIG. 11

DISPLAY DEVICE INCLUDING SENSING ELEMENTS AND DRIVING METHOD THEREOF

This application claims priority to Korean Patent Application No. 2006-0114022 filed on Nov. 17, 2006, and all the benefits accruing therefrom under 35 U.S.C. §119, the contents of which are herein incorporated by reference in its entirety.

BACKGROUND OF THE INVENTION

1. Field of the Invention

The present invention relates to a display device and a driving method thereof and in particular, a display device including sensing elements and a driving method thereof.

2. Description of the Related Art

A touch panel is disposed on a display device, so that a user may touch the touch panel with a hand or other objects so as to select an article displayed via the display device. A selected position is perceived via the touch panel. The display device drives the display panel according to the article corresponding to the position.

The display device including the touch panel needs no input device such as a keyboard or a mouse. Therefore, the display device including the touch panel becomes widely used.

The touch panel includes a first substrate, a second substrate, a first transparent electrode and a second transparent electrode. The first substrate is spaced apart from the second substrate. The first transparent electrode is formed on the first substrate. The second transparent electrode is formed on the second substrate. The first transparent electrode faces the second transparent electrode.

When the touch panel generates the information on touch, it sequentially reads electrical signals from the area where the first transparent electrode and the second transparent electrode contact with each other.

SUMMARY OF THE INVENTION

Accordingly, the present invention is provided to substantially solve one or more problems due to limitations and disadvantages of the related art.

It is a feature of the present invention to provide a touch panel display device with good sensitivity.

In one exemplary embodiment of the present invention, a liquid crystal display device having a liquid crystal display panel and a backlight assembly is provided. The liquid crystal display panel includes a plurality of touch sensors and a touch sensor controller. Each of the touch sensors is divided into two parts spaced apart from each other and generates an output signal in response to a compression of the liquid crystal display panel. A conductive pad and a conductive column spacer may be used as the two parts of a touch sensor. The distance between the conductive pad and the column spacer is about 0.01 to 0.1 times the distance between the first and second substrates of the liquid crystal display panel. One of the two substrates includes at least two sensing lines substantially perpendicular to each other, and at least one of the two sensing lines is connected to the touch sensors of the liquid crystal display panel. The touch sensor controller defines sensing units. Each of the sensing units includes at least two touch sensors. The touch sensor controller receives the output signal and generates coordinate information of the sensing unit when all of the touch sensors of the sensing unit are generating an output signal or at least one of the touch sensors of the sensing unit is generating an output signal.

In another exemplary embodiment of the present invention, a flat panel display device includes a display panel, and a touch sensor controller. The display panel includes at least two substrates spaced apart and a plurality of touch sensors. Each of the touch sensors generates an output signal containing location information in response to a touch to the first substrate and is disposed between the two substrates. The touch sensor controller defines at least one sensing unit including at least two touch sensors. Each of the touch sensors is divided into two conductive sections disposed on the two substrates separately. One of the two substrates includes at least two sensing lines substantially perpendicular to each other, and at least one of the two sensing lines is connected to a touch sensor. The touch sensor controller receives the output signal and generates coordinate information of the sensing unit when all of the touch sensors of the sensing unit are generating an output signal or at least one of the touch sensors of the sensing unit is generating an output signal.

BRIEF DESCRIPTION OF THE DRAWINGS

The present invention will become more apparent by describing embodiments thereof in detail with reference to the accompanying drawing in which.

DETAILED DESCRIPTION OF THE INVENTION

Hereinafter the preferred embodiments of the present invention will be described in detail with reference to the accompanying drawings.

Figure 1:
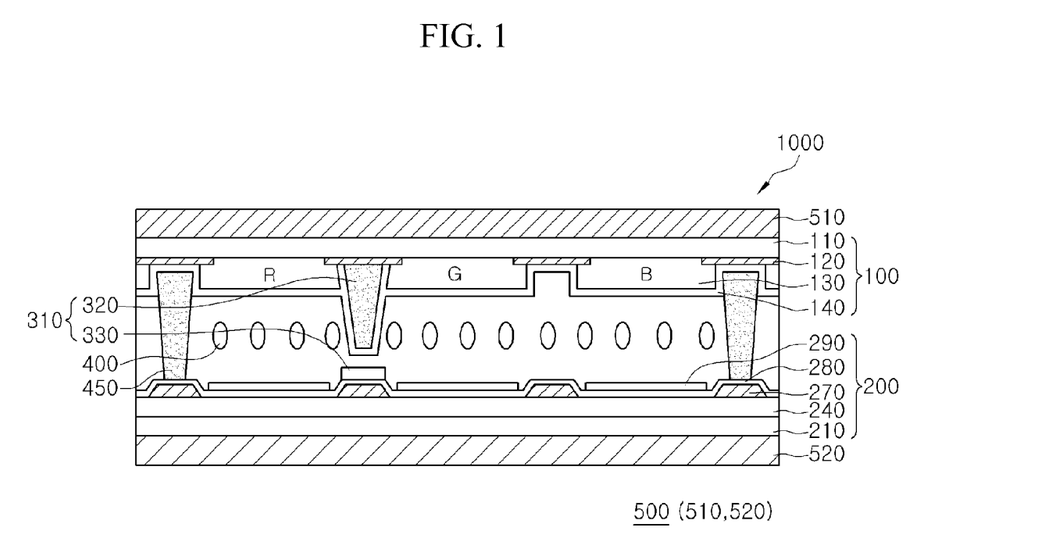
FIG. 1 is a schematic cross-sectional view showing a liquid crystal display panel according to a first exemplary embodiment of the present invention.

FIG. 1 is a schematic cross-sectional view showing a liquid crystal display panel according to a first embodiment of the present invention.

Referring to FIG. 1, a liquid crystal display panel 1000 includes a color filter substrate 100, an array substrate 200, a touch sensor 310, a liquid crystal layer 400 and polarizing film 500.

The color filter substrate 100 includes a transparent insulating substrate 110, a black matrix layer 120, a color filter layer 130, a common electrode layer 140 and a conductive column spacer 320. The array substrate 200 includes a transparent insulating substrate 210, a thin film transistor (TFT) layer, and a pixel electrode layer 290. A liquid crystal layer 400 is disposed between the color filter substrate 100 and the array substrate 200. The first polarizing film 510 and the second polarizing film 520 are disposed outside the color filter substrate 100 and the array substrate 200 separately. A spacer 450 is disposed between the color filter substrate 100 and the array substrate 200 for spacing apart said substrates. Various kinds of spacers can be used for this purpose, such as column spacers and ball spacers.

The touch sensor 310 is divided into two parts, a conductive column spacer 320 disposed on the color filter substrate 100 and a conductive pad 330 disposed on the array substrate 200 opposed to the conductive column spacer 320. The conductive column spacer 320 and the conductive pad 330 are not connected electrically to each other whenever there is no touching of the display panel.

The touch sensor 310 senses a change in the voltage caused by a change in the distance between the conductive column spacer 320 and the conductive pad 330 and sends a signal containing location information to a touch sensor controller via sensing lines. When a touch to the display panel is made, the conductive column spacer 320 close to the touching point contacts the conductive pad 330 opposed to the column spacer 320 because of the pressure made by the touch. And when the touch is removed, the conductive column spacer 320 is spaced apart from the conductive pad 330 because of the removal of the pressure made by the touch. So it is possible to determine the point that a touch to the panel is made by sensing the voltage changes between the conductive column spacer 320 and the conductive pad 330.

Figure 2:
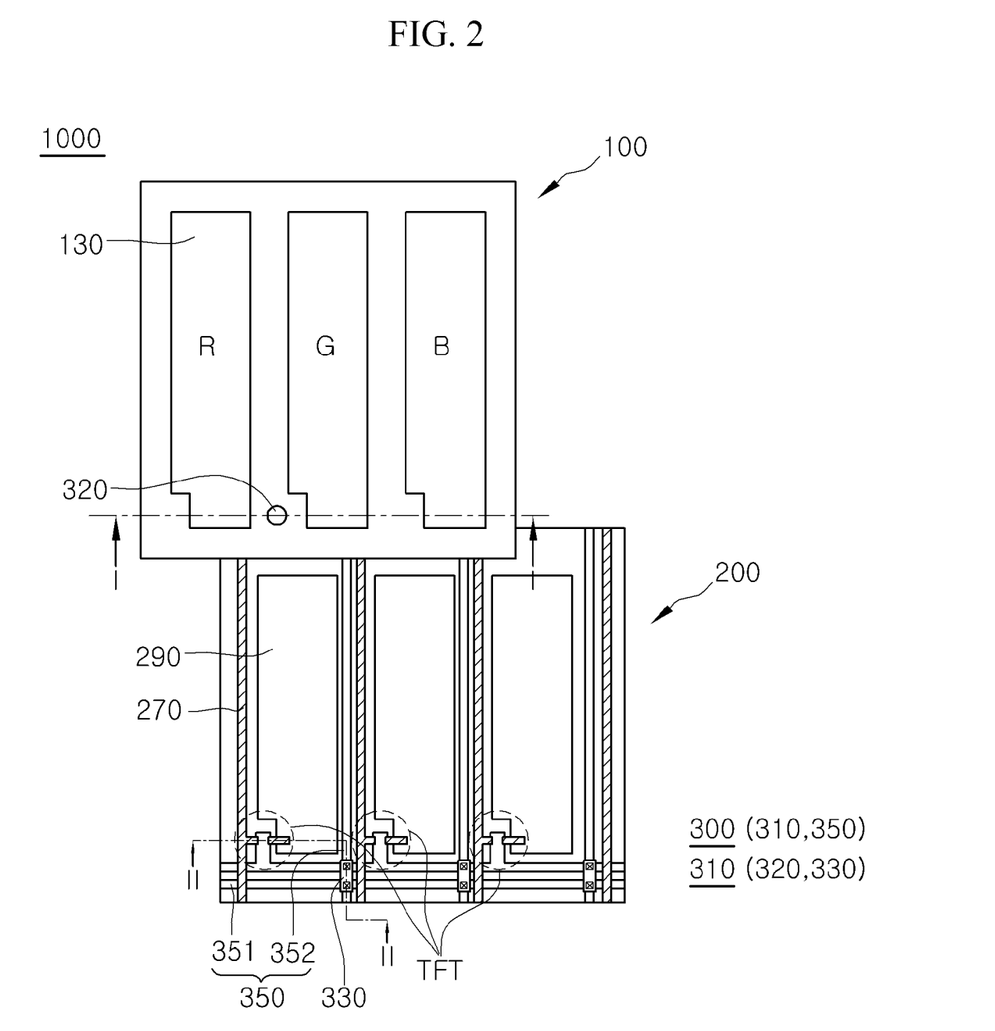
FIG. 2 is a layout showing an array substrate of a liquid crystal display panel according to a first exemplary embodiment of the present invention.
Figure 3:
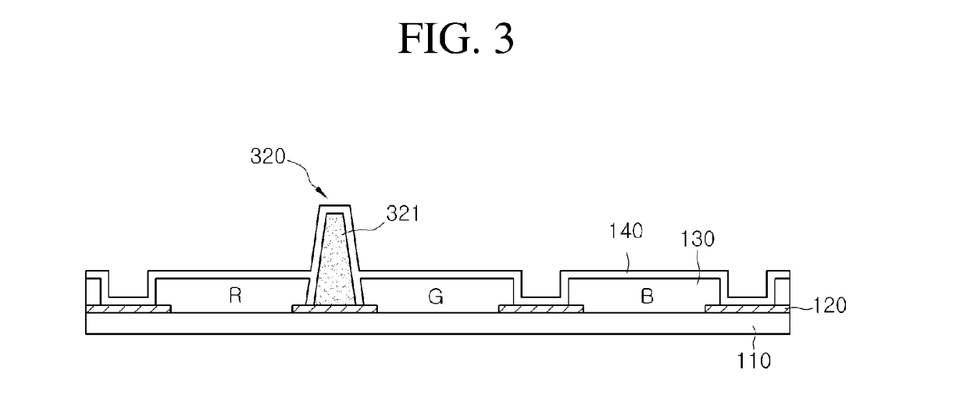
FIG. 3 is a cross-sectional view showing a color filter substrate of a liquid crystal display panel of FIG. 2.
Figure 4:
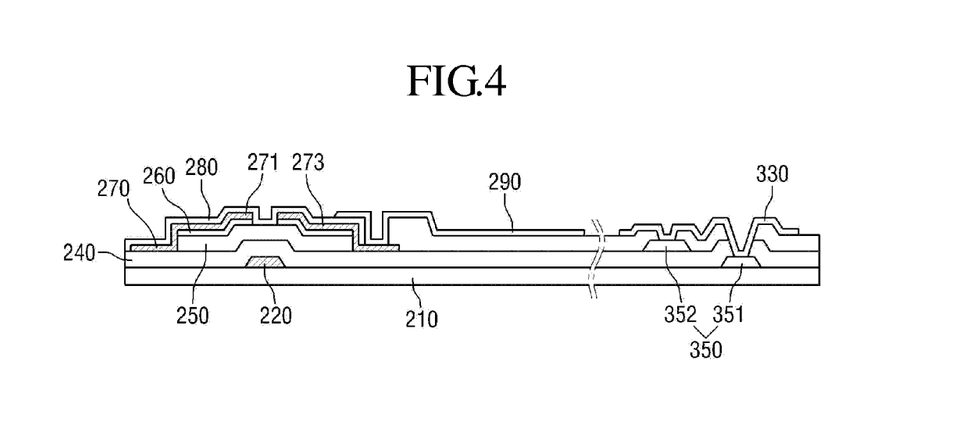
FIG. 4 is a cross-sectional view showing an array substrate of a liquid crystal display panel of FIG. 2.

FIG. 2 is a layout showing an array substrate of a liquid crystal display panel according to a first embodiment of the present invention. FIG. 3 and FIG. 4 are cross-sectional views showing a liquid crystal display panel of FIG. 2.

Referring to FIG. 2, a liquid crystal display panel according to a first embodiment of the present invention includes a color filter substrate 100 and an array substrate.

The color filter substrate 100 includes color filters 130 including red, green and blue color filters, a black matrix layer and conductive column spacers 320. The conductive column spacers 320 are disposed on every dot defined by three color filters including a red, a green and a blue color filter to form a conductive column spacer array. The number of conductive column spacers 320 and array method thereof are not limited to the embodiment described herein above. Various kinds of arrangement methods may be used by those skilled in the present art.

The array substrate 200 disposed opposite of the color filter substrate 100 includes gate lines 220, data lines 270, pixel electrodes 290 and thin film transistors (TFTs). The gate lines 220 transporting a gate signal are extended in a first direction and the data lines 270 transporting a data signal are extended in a second direction. The array substrate 200 further includes first sensing lines 351 and second sensing lines 352. The direction of the first sensing lines 351 are substantially parallel to the direction of gate lines 220 and the direction of the second sensing lines 352 are substantially parallel to the direction of data lines 270. Conductive pads 330 are disposed on each point where first sensing lines 351 and second sensing lines 352 meet. Conductive pads 330 are electrically connected to the two sensing lines and spaced apart from the conductive column spacers 320 opposed to the conductive pads 330.

A touch to the liquid crystal display panel according to the present embodiment causes compression between the area of the color filter substrate 100 opposed to the touch and the array substrate 200 opposite the color filter substrate 100. A conductive column spacer 320 disposed on the area of the color filter substrate 100 contacts a conductive pad 330 opposite the conductive column spacer 320 because of the compression caused by the touch. The contact between the conductive column spacer 320 and the conductive pad 330 changes the electric resistance and the voltage of the touch sensor including the conductive column spacer 320 and the conductive pad 330. The first sensing line 351 and the second sensing line 352 connected to the touch sensor transport changes in the voltage in the sensor to the touch sensor controller 600. The touch sensor controller 600 perceives the changes in voltage and generates coordinates corresponding to the area where the voltage has changed.

The conductive pads 330 are disposed at the intersection of the first sensing lines 351 and the second sensing lines 352 and are isolated from the pixel electrodes 290 according to this embodiment. The arrangement methods of the conductive pads 330 are not limited in this embodiment. Various kinds of arrangement methods may be used by those skilled in the present art.

Referring to FIG. 3, a black matrix layer 120 is disposed on a transparent insulating substrate 11 0. A glass substrate may be used as the transparent insulating substrate 110 and metallic materials such as chrome or carbonic materials or organic materials may be used to form the black matrix layer 120. A plurality of color filters are disposed on the substrate 1 10 after forming the black matrix layer. A plurality of bumps 321 are formed on the black matrix layer 120. The bumps may be formed through the following process. First, an organic or inorganic non-conductive layer is deposited on the color filters disposed on the substrate 110 and then the bumps 321 are formed by a photolithography process using a mask. A transparent conductive layer is disposed on the color filters 130 and bumps 321 to form a common electrode 140 and conductive column spacers 320. Indium-Tin-Oxide (ITO) or Indium-Zinc-Oxide (IZO) may be used as a material for forming the common electrode 140 and conductive column spacers 320. The conductive column spacers 320 can be formed by the process described above or can be formed by dot printing without photolithography.

Referring to FIG. 4, gate lines 220 and first sensing lines 351 are formed on the transparent insulating substrate 210. A gate insulating layer 240, an amorphous silicon layer 250 and an amorphous silicon layer doped with impurities 260 are deposited respectively and form thin film transistors. Data lines 270, which include source electrodes 271 protruding therefrom, drain electrodes 273, and second sensing lines 352 are formed on the substrate 210. The passivation layer 280 is deposited on the substrate 210 and covers most areas of the substrate including data line 270 and second sensing lines 352. Pixel electrodes 290 and conductive pads 330 are disposed on the passivation layer 280. The pixel electrodes 290 contact the drain electrodes 273 via a contact hole formed in the passivation layer 280, and conductive pads 330 contact the first and the second sensing lines 351 and 352 via a contact hole formed in the passivation layer 280. The pixel electrodes 290 and the conductive pads 330 are formed of transparent conductive materials such as ITO or IZO. The conductive pads 330 are disposed at the intersection of the first sensing lines 351 and the second sensing lines 352, and are isolated from the pixel electrodes 290.

Figure 5:
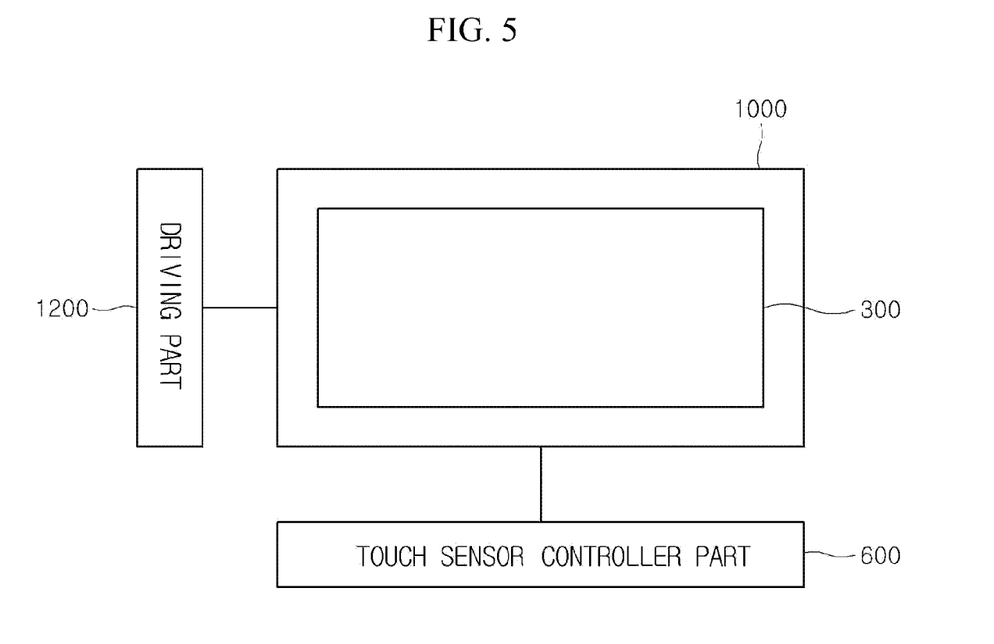
FIG. 5 is a block diagram showing a liquid crystal display device according to an embodiment of the present invention.

FIG. 5 is a block diagram showing a liquid crystal display device according to an embodiment of the present invention.

Referring to FIG. 5, a liquid crystal display device 1000 includes a touch sensor part 300 including touch sensors and sensing lines, a touch sensor controller part 600 and a driving part 1200.

The touch sensing part 300 includes conductive column spacers on the color filter substrate, conductive pads on the array substrate, first sensing lines and second sensing lines. The touch sensors of the touch sensor part 300 senses the changes of the voltage between the conductive column spacers and the conductive pads opposed to the conductive column spacers. Sensing lines 350 transport the signals made by the changes of the voltage to the touch sensor controller part 600. The touch sensor controller part 600 receives the signals, senses where the voltage has changed, and generates coordinates of the area where the voltage has changed. The touch sensor controller part 600 can control the pointer in the screen of the liquid crystal display panel by the coordinates generated. The touch sensor controller part 600 may be disposed on the liquid crystal panel or a driving circuit separated from the liquid crystal panel.

Figure 6:
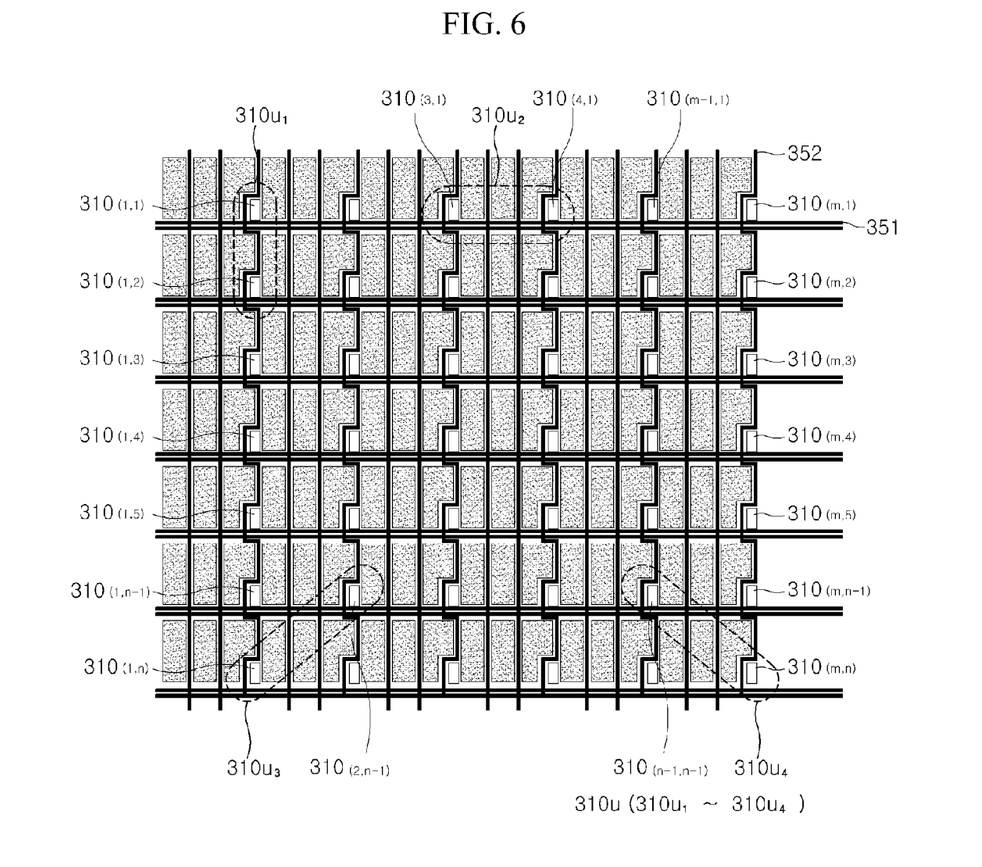
FIG. 6 is a layout showing sensing units according to an embodiment of the present invention.
Figure 7A:
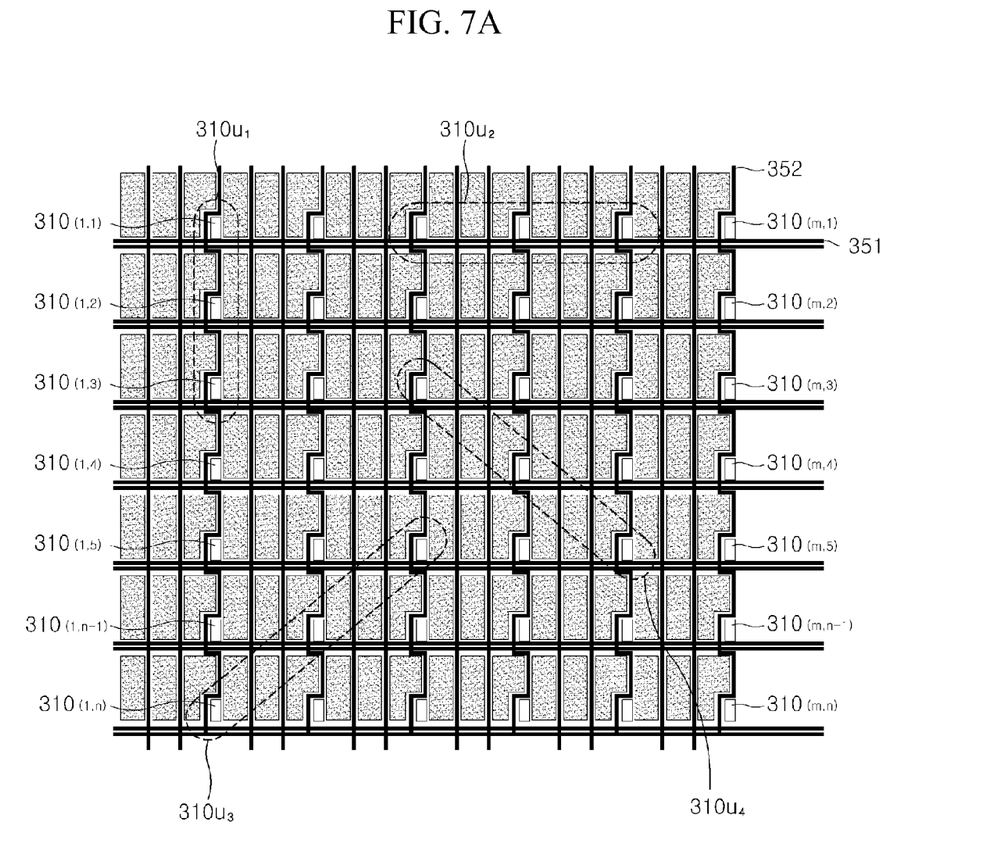
FIG. 7A and 7B are layouts showing sensing units according to an embodiment of the present invention.
Figure 7B:
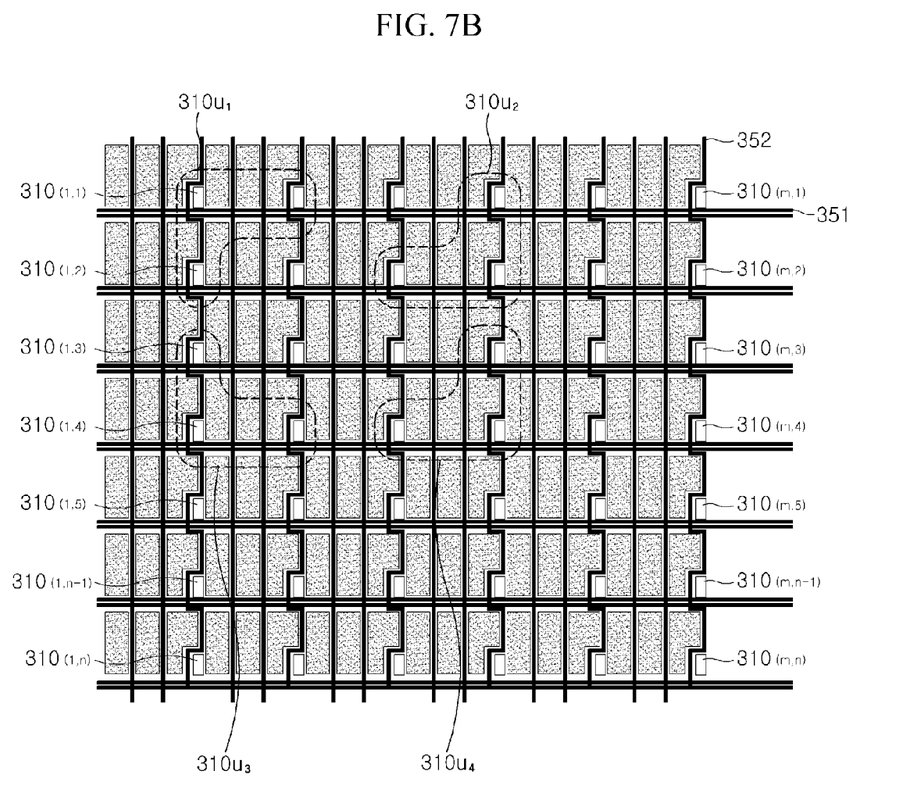

FIG. 6, FIG. 7A and FIG. 7B are layouts showing sensing units according to an embodiment of the present invention.

Referring to FIG. 6 the touch sensing part 300 includes first sensing lines 351 extended in a first direction substantially parallel to the longitudinal direction of the liquid crystal display panel, second sensing lines 352 extended in a second direction substantially perpendicular to the first direction and touch sensors 310. The touch sensors are disposed in array of a m×n matrix and on every dot defined by three pixels including a red, a green and a blue pixel. The number of touch sensors 310 and array method thereof is not limited to this embodiment described herein above. Various kinds of arrangements and methods may be used by those skilled in the present art.

The touch sensing part 300 of this embodiment is divided into a plurality of sensing units. Each of the sensing units 310$u$ include two touch sensor 310($x$, $y$) adjacent to each other. The shape of the sensing unit 310$u$ is not limited to a particular form. Two touch sensors in a sensing unit may be adjacent to each other in the first direction (310(3, 1), 310(4, 1)) or the second direction (310(1, 1), 310(1, 2)) as shown in the first sensing unit 310$u$1 or the second sensing unit 310$u$2. Also two touch sensors in a sensing unit may be adjacent to each other in a diagonal direction (310(1, n), 310(2, n−1)), (310($m$−1, n−1), 310($m$, $n$)) as shown in the third sensing unit 310$u$3 or the forth sensing unit 310$u$4. One of the patterns for a sensing unit with two touch sensors described above may be used as a pattern for a sensing unit in the touch sensing part 300. Also various kinds of patterns for a sensing unit with two touch sensors including the patterns described above may be used in the touch sensing part 300 together.

Referring to FIG. 7A and 7B, there are three touch sensors in one sensing unit. FIG. 7A shows three touch sensors adjacent to each other forming a line and FIG. 7B shows three touch sensors adjacent to each other have an 'L' shape.

The patterns of the sensing unit are not limited to those described above and various kinds of patterns may be used by those skilled in the present art.

Figure 8A:
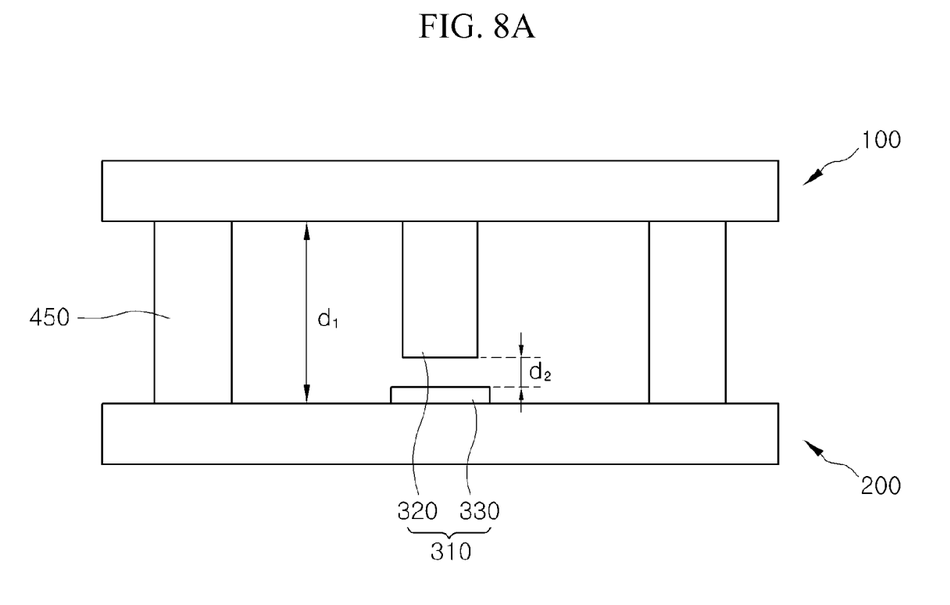
FIG. 8A is a cross-sectional view showing a liquid crystal display panel with touch sensors having high sensitivity.
Figure 8B:
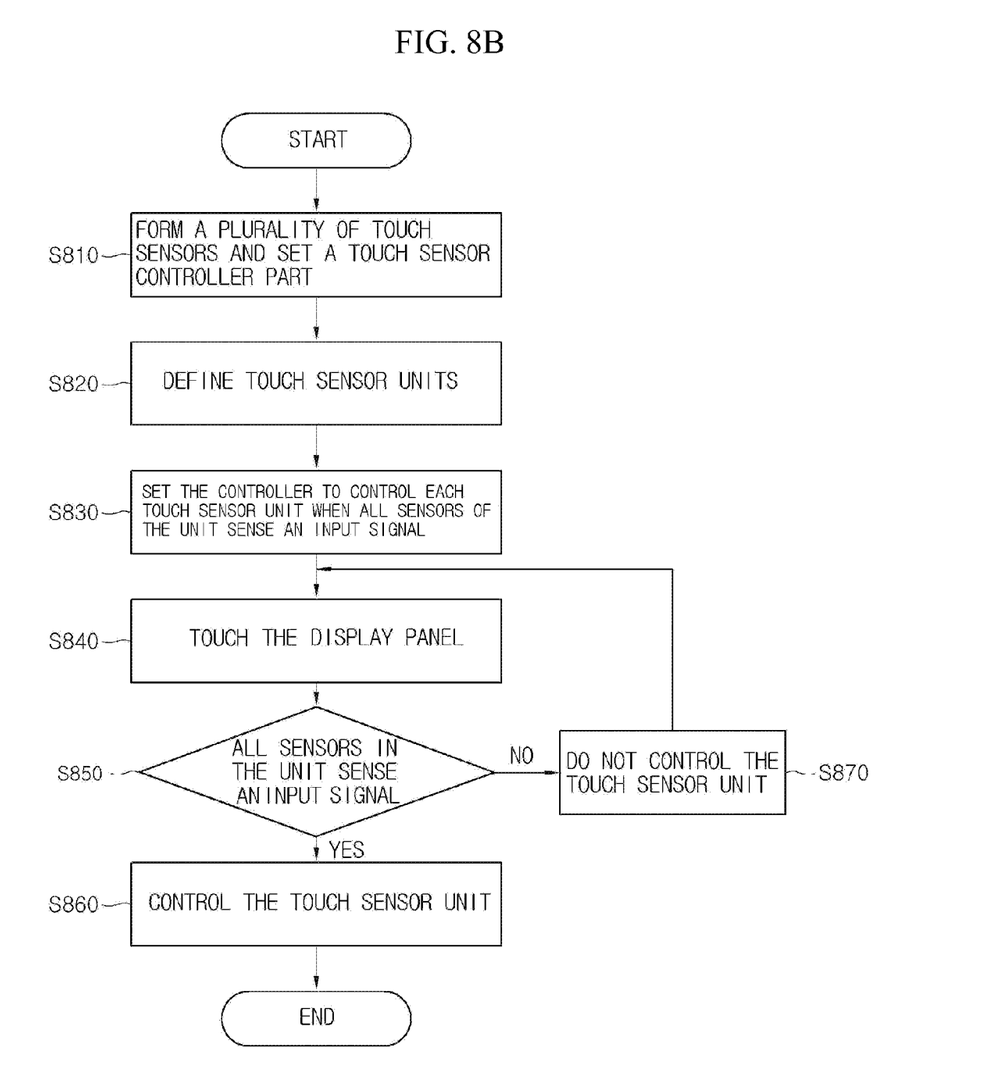
FIG. 8B is a flow chart illustrating a driving method of a liquid crystal display shown in FIG. 8B.

FIG. 8A is a cross-sectional view showing a liquid crystal display panel with touch sensors having high sensitivity. FIG. 8B is a flow chart illustrating a driving method of a liquid crystal display shown in FIG. 8B.

Referring to FIG. 8A, a liquid crystal display panel includes a color filter substrate 100, an array substrate 200, a liquid crystal layer disposed between the two substrates, a spacer 450 and a touch sensor 310. The spacer is disposed between the color filter substrate 100 and the array substrate 200 for keeping a space between the two substrates. The touch sensor 310 includes a conductive column spacer 320 and a conductive pad 330 opposed to and spaced apart from the conductive column spacer 320. When a distance between the conductive pad and the conductive column spacer d2 is within 0.01 to 0.1 times the distance between the two substrates d1, the conductive pad 330 and the conductive column spacer 320 easily contact each other even under very low pressure. Also the probability of causing a short in sensor 310 by a small particle is increased because the distance d2 is too small.

FIG. 8B illustrates a driving method for successfully decreasing the probability of causing the problems to a liquid crystal display panel described above. A liquid crystal display panel illustrated in FIG. 8B includes a touch sensing part including a plurality of touch sensors and a touch sensor controlling part (S810). A plurality of sensing units, each of the units including at least two of the touch sensors, is defined (S820). The touch sensor controller is set up to control each sensing unit when all touch sensors of the unit sense an input signal (S830). When a touch to the liquid crystal display panel is made (S840), the touch sensor controller part decides whether all the touch sensors of the unit opposite the touched position of the liquid crystal display panel sense the input signal made by the touch (S850). If all the touch sensors of the sensing unit sense the input signal, the touch sensor controller part controls the sensing unit (S860). If at least one of the touch sensors of the sensing unit does not sense any signal, the touch sensor controller part does not control the sensing unit (S870).

Figure 9A:
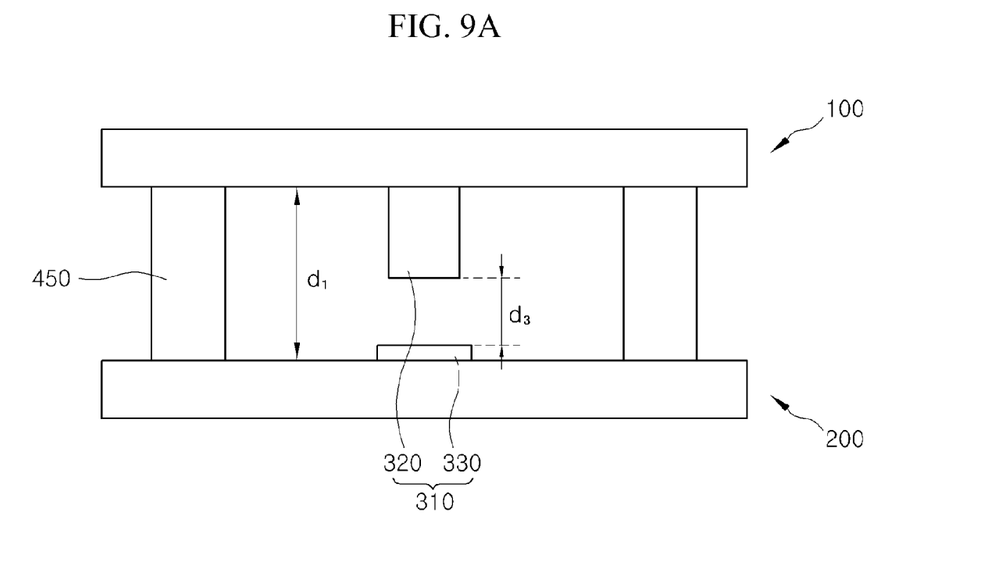
FIG. 9A is a cross-sectional view showing a liquid crystal display panel with touch sensors having low sensitivity.
Figure 9B:
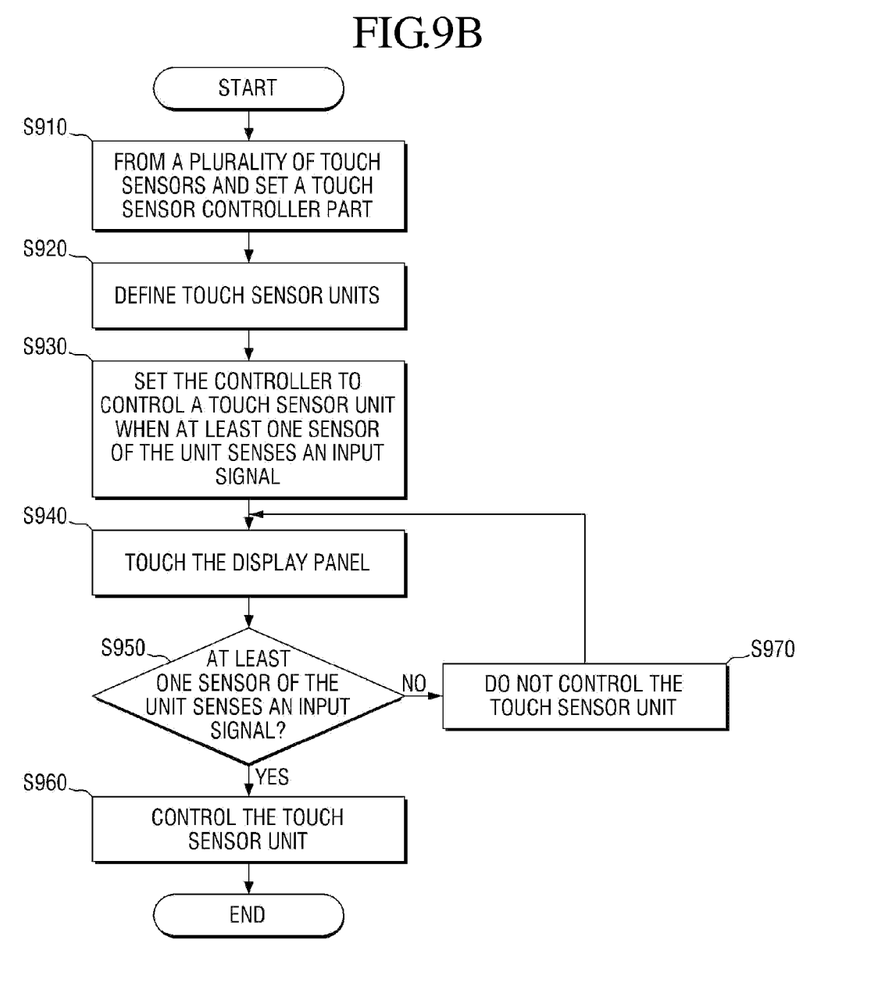
FIG. 9B is a flow chart illustrating a driving method of a liquid crystal display panel shown in FIG. 9B.

FIG. 9A is a cross-sectional view showing a liquid crystal display panel with touch sensors having low sensitivity. FIG. 9B is a flow chart illustrating a driving method of a liquid crystal display panel showed in FIG. 9B.

Referring to FIG. 9A, the structure of a liquid crystal display panel is the same as the structure of the liquid crystal display panel shown in FIG. 8A except for the distance between the conductive column spacer 320 and the conductive pad 330. The distance between the conductive pad 330 and the conductive column spacer d3 is longer than the distance d2 showed shown in FIG. 8A. Thus, the probability for the conductive pad 330 and the conductive column spacer 320 to contact each other under low pressure is not high. However, the longer distance d3 may cause less sensitivity of the touch sensor 310.

FIG. 9B illustrates a driving method for successfully increasing the sensitivity of the liquid crystal display panel shown in FIG. 9A to a touch. A liquid crystal display panel illustrated in FIG. 9B includes a touch sensing part including a plurality of touch sensors and a touch sensor controlling part (S910). A plurality of sensing units, each of the units including at least two of the touch sensors, is defined (S920). The touch sensor controller is set up to control each sensing unit when at least one of the touch sensors of the each unit senses an input signal (S930). When a touch to the liquid crystal display panel is made (S940), the touch sensor controller part decides whether at least one of the touch sensors of the unit opposite the touched position of the liquid crystal display panel senses the input signal made by the touch (S950). If at least one of the touch sensors of the sensing unit senses the input signal, the touch sensor controller part controls the sensing unit (S960). If at least one of the touch sensors of the sensing unit does not sense any signal, the touch sensor controller part does not control the sensing unit (S970).

Figure 10:
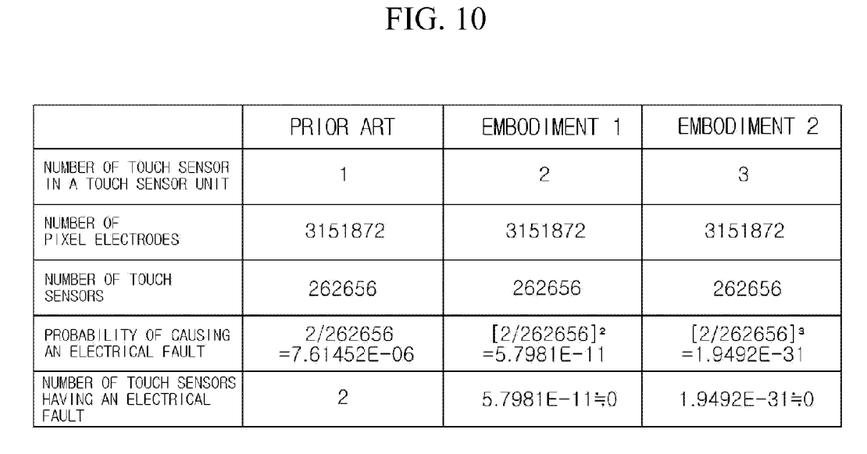
FIG. 10 is a table that compares the probability of causing an electrical fault for a liquid crystal display panel with touch sensors according to the embodiments of the present invention and prior art.

FIG. 10 is a table that compares the probability of causing an electrical fault for a liquid crystal display panel with touch sensors according to the embodiments of the present invention and prior art.

The table in FIG. 10 compares liquid crystal display panels having an array of 1368×768 including touch sensors according to the present invention and prior art. Touch sensors are disposed every twelve pixels in each of the liquid crystal display panels. So each panel has 3,151,872 pixels and 262,656 touch sensors. The probability of causing an electrical fault for the liquid crystal display panel according to the prior art is 7.61452E-06 (2/262,656). The probability of causing an electrical fault for a liquid crystal display panel including a plurality of sensing units according to the present invention is 5.7981E-11 ((2/262656)2) if each of the sensing units has two touch sensors and 1.9492E-31 if each of the sensing units has three touch sensors.

Figure 11:
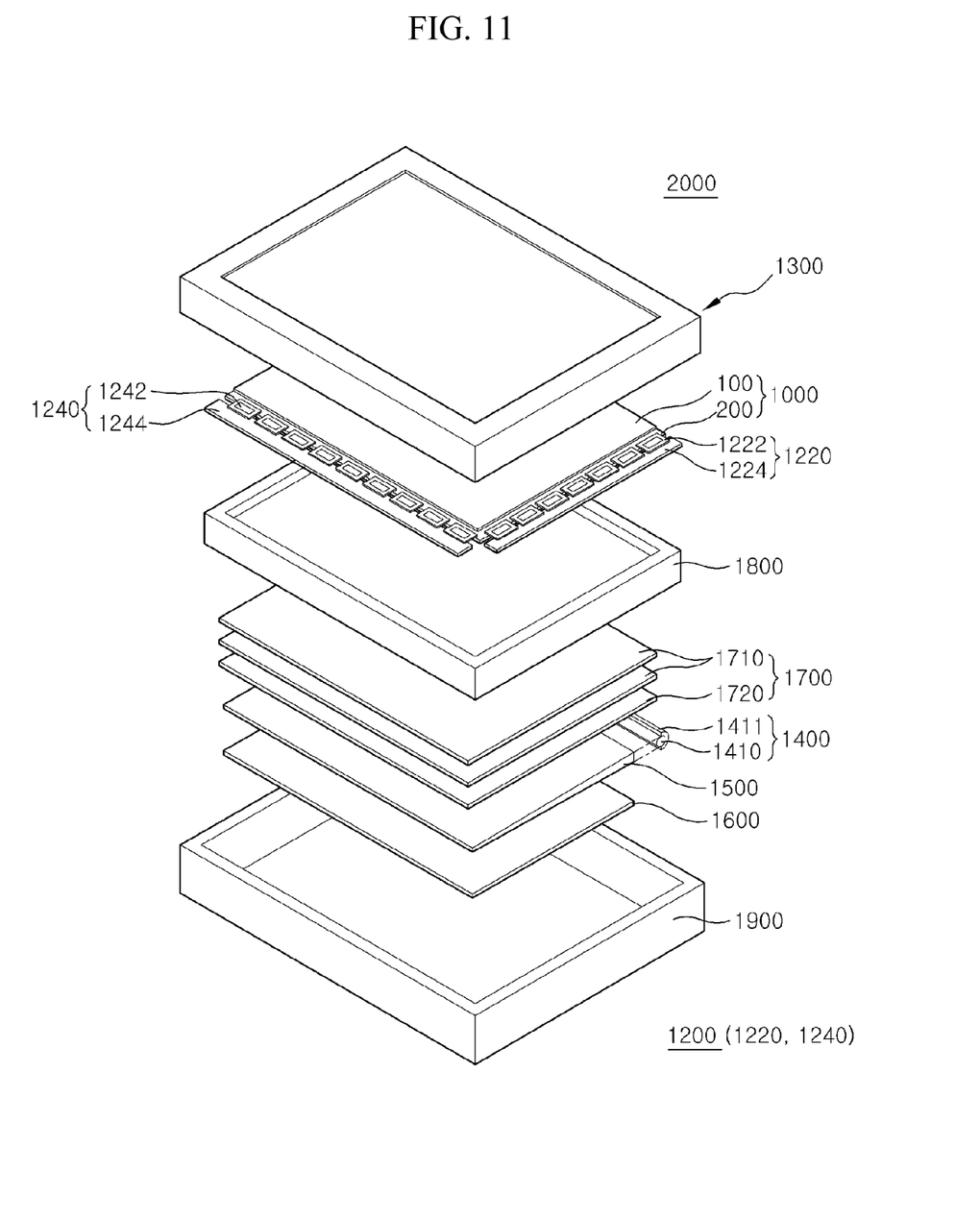
FIG. 11 is an exploded perspective view showing a liquid crystal display device with touch sensors according to the present invention.

FIG. 11 is an exploded perspective view showing a liquid crystal display device with touch sensors according to the present invention.

Referring to FIG. 11, a liquid crystal display device 2000 includes a top frame 1300, a liquid crystal display panel 1000, driving circuit parts 1220, 1240 and a back light unit including a mold frame 1800, optical sheets 1700, an optical plate 1500, a lamp unit 1400 and a bottom frame 1900. The liquid display panel 1000 is disposed between the top frame 1300 and the backlight assembly and includes a color filter substrate 100, an array substrate 200, a touch sensor part, a liquid crystal layer and polarizing film. The driving circuit parts 1220, 1240 applying a gate and a data signals to the liquid crystal display panel are connected to the liquid crystal display panel and include printed circuit boards (PCB) 1224, 1244 and tape carrier packages (TCP) 1222, 1242. The lamp unit 1400 includes a lamp 1410 and a lamp reflector 1411. The optical plate 1500 and the optical sheets 1700 are disposed between the bottom frame 1900 and the liquid crystal display panel 1000 to change an optical path while guiding the light emitted from the lamp unit toward the liquid crystal display panel to improve the brightness and the uniformity of the light emitted from the lamp unit. A reflective film 1600 is disposed on the bottom frame 1900 to reflect the light emitted toward the reflective film. This embodiment shows an edge shaped backlight using a lamp, but various kinds of backlight assemblies may be used. The top frame 1300 includes first to fourth barrier ribs and is combined with the mold frame 1800.

The above-described exemplary methods may be employed to other display devices including, but not limited to organic light emitting diode (OLED) display, plasma display panel (PDP), and the like.

Having described the embodiments of the present invention and its advantages, it is noted that various changes, substitutions and alternations can be made herein without departing from the sprit and scope of the invention as defined by appended claims.

What is claimed is:

1. A liquid crystal display device comprising:
 a liquid crystal display panel comprising a first substrate and a second substrate spaced apart by a distance t, and a liquid crystal layer disposed therebetween;
 a sensing unit disposed between the first substrate and second substrate, the sensing unit comprising at least two touch sensors disposed adjacent to each other, each of the touch sensors comprising a conductive pad and a conductive column spacer spaced apart from the conductive pad and configured to generate an output signal in response to a compression of the liquid crystal display panel; and
 a touch sensor controller in communication with the sensing unit, the touch sensor controller configured to receive the output signal and configured to generate coordinates information based on the output signal,
 wherein the touch sensor controller generates the coordinates information when all of the at least two touch sensors generate an output signal and does not generate the coordinates information when at least one but less than all of the at least two touch sensors generate an output signal.

2. The liquid crystal display device of claim 1, wherein the conductive pad is disposed within 0.01 to 0.1 times the distance t from the conductive column spacer.

3. The liquid crystal display device of claim 1, wherein the conductive pad is disposed on the first substrate and the conductive column spacer is disposed on the second substrate.

4. The liquid crystal display device of claim 3, wherein the first substrate comprises a first sensing line connected to the conductive pad and a second sensing line substantially perpendicular to the first sensing line.

5. The liquid crystal display device of claim 3, wherein the first substrate comprises a plurality of transistors and pixel electrodes disposed thereon.

6. The liquid crystal display device of claim 3, wherein the second substrate comprises a common electrode and a plurality of color filters disposed thereon.

7. The liquid crystal display device of claim 1, wherein the liquid crystal display device further comprises a backlight assembly disposed below the liquid crystal display panel.

8. A liquid crystal display device comprising:
 a liquid crystal display panel comprising a first substrate and a second substrate spaced apart by a distance t, and a liquid crystal layer disposed therebetween;
 a sensing unit disposed between the first substrate and second substrate, the sensing unit comprising at least two touch sensors disposed adjacent to each other, each of the touch sensors comprising a conductive pad and a conductive column spacer spaced apart from the conductive pad and configured to generate an output signal in response to a compression of the liquid crystal display panel; and
 a touch sensor controller in communication with the sensing unit, the touch sensor controller configured to receive the output signal and configured to generate coordinates information of an area of the sensing unit based on the output signal,
 wherein the touch sensor controller generates the coordinates information of the area of the sensing unit when a first touch sensor of the at least two touch sensors generates the output signal and a second touch sensor of the at least two touch sensors does not generate the output signal, and when the first touch sensor does not generate the output signal and the second touch sensor generates the output signal.

9. A flat panel display device comprising:
 a first substrate;
 a second substrate spaced apart from the first substrate;
 a plurality of touch sensors disposed between the first substrate and the second substrate, each of the touch sensors comprising a first conductive section and a second conducting section spaced apart therefrom and configured to generate an output signal in response to a touch to the first substrate; and a touch sensor controller defining at least one sensing unit comprising at least two of the touch sensors disposed adjacent to each other, the touch sensor controller configured to receive the output signal and configured to generate coordinates information based on the output signal, wherein the touch sensor controller generates the coordinates information when all of the at least two touch sensors generate an output signal and does not generate the coordinates information when at least one but less than all of the at least two touch sensors generate an output signal.

10. The flat panel display device of claim 9, wherein the first conductive section is disposed on the first substrate and the second conductive section is disposed on the second substrate.

11. The flat panel display device of claim 10, wherein the first substrate comprises a first sensing line connected to the first conductive section and a second sensing line substantially perpendicular to the first sensing line.

12. A flat panel display device comprising:
a first substrate;
a second substrate spaced apart from the first substrate;
a plurality of touch sensors disposed between the first substrate and the second substrate, each of the touch sensors comprising a conductive pad and a conductive column spacer spaced apart from the conductive pad and configured to generate an output signal in response to a touch to the first substrate; and a touch sensor controller defining at least one sensing unit comprising at least two of the touch sensors disposed adjacent to each other, the touch sensor controller configured to receive the output signal and configured to generate coordinates information of an area of the sensing unit based on the output signal, wherein the touch sensor controller generates the coordinates information of the area of the sensing unit when a first touch sensor of the at least two touch sensors generates the output signal and a second touch sensor of the at least two touch sensors does not generate the output signal, and when the first touch sensor does not generate the output signal and the second touch sensor generates the output signal.

13. A method of sensing a touch in a flat panel display device comprising a first substrate, a second substrate spaced apart from the first substrate, a plurality of touch sensors, and a touch sensor controller, said method comprising:

defining a sensing unit between the first substrate and the second substrate, the sensing unit comprising at least two of the touch sensors arranged adjacent to each other, each of the touch sensors comprising a conductive pad and a conductive column spacer spaced apart from the conductive pad;

receiving output signals sent from the touch sensors of the sensing unit, wherein the output signals are generated by a touch to the first substrate;

determining that the sensing unit senses the touch when the touch sensor controller determines that all of the at least two touch sensors generate an output signal and not when the touch sensor controller determines that at least one but less than all of the at least two touch sensors generate an output signal; and generating coordinates information of the sensing unit in response to the sensed touch.

14. A method of sensing a touch in a flat panel display device comprising a first substrate, a second substrate spaced apart from the first substrate, a plurality of touch sensors, and a touch sensor controller, said method comprising:

defining a sensing unit between the first substrate and the second substrate, the sensing unit comprising at least two of the touch sensors arranged adjacent to each other, each of the touch sensors comprising a conductive pad and a conductive column spacer spaced apart from the conductive pad and;

receiving output signals sent from the touch sensors of the sensing unit, wherein the output signals are generated by a touch to the first substrate;

determining that the sensing unit senses the touch when the touch sensor controller determines that a first touch sensor of the at least two touch sensors generates the output signal and a second touch sensor of the at least two touch sensors does not generate the output signal, and when the first touch sensor does not generate the output signal and the second touch sensor generates the output signal; and generating coordinates information of an area of the sensing unit in response to the sensed touch.

* * * * *